United States Patent
Roussel et al.

(10) Patent No.: US 7,004,519 B2
(45) Date of Patent: Feb. 28, 2006

(54) AUTOMOBILE BEAM

(75) Inventors: Thierry Roussel, Fayl la Fortet (FR);
Stephane Malteste, Meximieux (FR);
Frederic Pierrot, Lagnieu (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/725,186

(22) Filed: Dec. 1, 2003

(65) Prior Publication Data
US 2004/0262931 A1 Dec. 30, 2004

(30) Foreign Application Priority Data
Nov. 29, 2002 (FR) .................................. 02 15100

(51) Int. Cl.
*B60R 19/03* (2006.01)
(52) U.S. Cl. ..................... 293/120; 293/121; 293/132
(58) Field of Classification Search ................ 293/120, 293/121, 122, 102, 103, 132, 133, 155; 296/187.03, 296/187.09
See application file for complete search history.

(56) References Cited

U.S. PATENT DOCUMENTS

| | | | | |
|---|---|---|---|---|
| 3,897,095 A | * | 7/1975 | Glance et al. | 293/120 |
| 4,088,357 A | * | 5/1978 | Klie et al. | 293/122 |
| 4,482,180 A | * | 11/1984 | Huber et al. | 293/120 |
| 4,492,398 A | * | 1/1985 | Peter | 293/120 |
| 4,542,925 A | * | 9/1985 | Huber et al. | 293/120 |
| 4,652,032 A | * | 3/1987 | Smith | 293/120 |
| 4,826,226 A | * | 5/1989 | Klie et al. | 293/120 |
| 4,998,761 A | * | 3/1991 | Bayer et al. | 293/121 |
| 5,139,297 A | * | 8/1992 | Carpenter et al. | 293/132 |
| 5,271,650 A | | 12/1993 | Fukuhara et al. | |
| 5,658,027 A | | 8/1997 | Eissinger et al. | |
| 5,780,129 A | * | 7/1998 | Ohta | 428/35.7 |
| 6,474,708 B1 | * | 11/2002 | Gehringhoff et al. | 293/120 |
| 6,669,252 B1 | * | 12/2003 | Roussel et al. | 293/120 |
| 6,746,061 B1 | * | 6/2004 | Evans | 293/120 |
| 6,758,507 B1 | * | 7/2004 | Tarahomi et al. | 293/120 |
| 6,814,380 B1 | * | 11/2004 | Yoshida et al. | 293/120 |
| 6,908,127 B1 | * | 6/2005 | Evans | 293/120 |

FOREIGN PATENT DOCUMENTS

| | | |
|---|---|---|
| EP | 0 652 138 | 5/1995 |
| JP | 61 110529 | 5/1986 |
| JP | 09 011323 | 1/1997 |

* cited by examiner

Primary Examiner—H. Gutman
(74) Attorney, Agent, or Firm—James R. Williams

(57) ABSTRACT

The invention relates to a motor vehicle beam shell designed to be placed behind a bumper skin, said shell being provided with a recess for receiving a strength member inside it, the strength member being, for example, a strength member made of metal, in particular of aluminum, or a strength member made of a composite material incorporating a metal. The beam is provided with shell cladding which interfits with the shell, thereby forming a hollow body defining a recess for receiving the strength member.

12 Claims, 2 Drawing Sheets

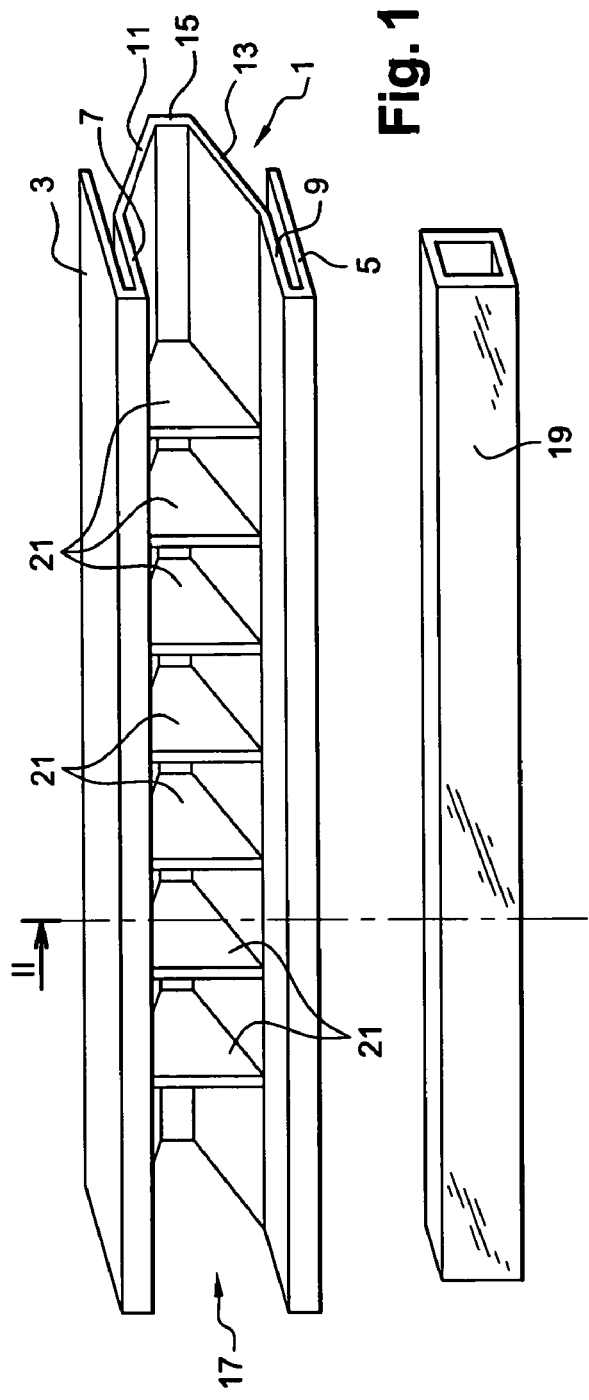
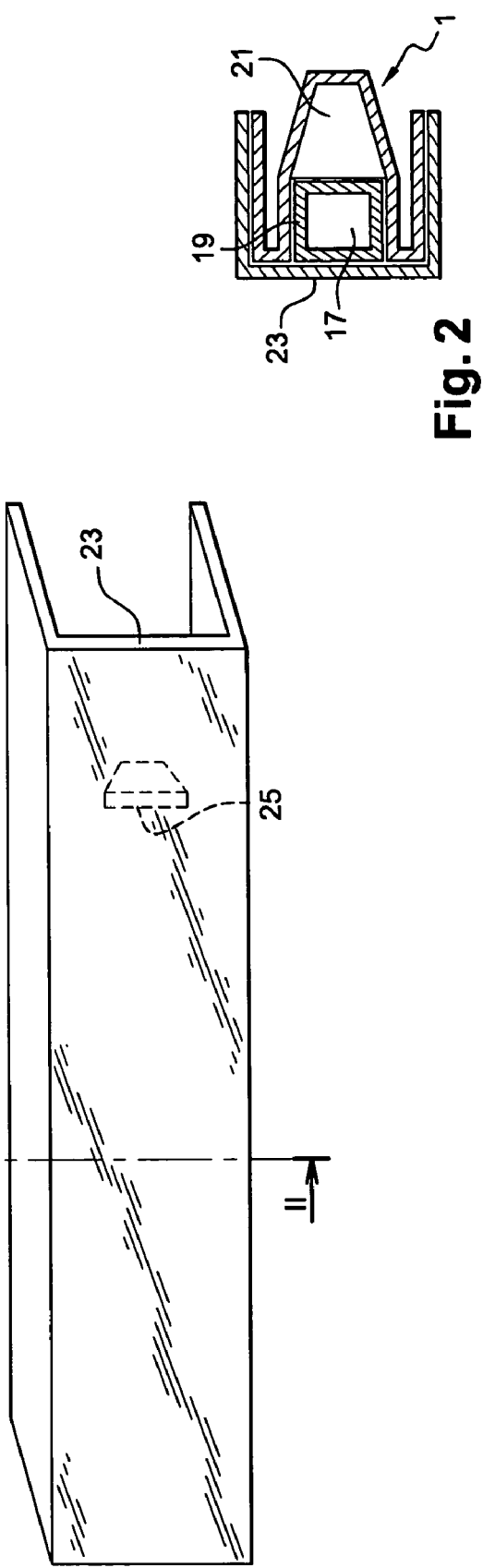

AUTOMOBILE BEAM

The present invention relates to a motor vehicle beam shell and to a motor vehicle beam.

BACKGROUND OF THE INVENTION

It is known that motor vehicle bumpers have cross-beams whose function is to absorb a large portion of the energy from impacts.

A test in wide use, in particular in the United States, for verifying the strength of a bumper is known as the "pole test". Such a test consists in subjecting the rear of the vehicle to an impact on its middle axis at a speed of 8 kilometers per hour (km/h) against a fixed pole that is 7 inches (about 178 millimeters (mm)) in diameter. The test is considered to be satisfactory if the cost of repairing the vehicle after such a test is lower than a certain threshold.

In order to limit the repair costs resulting from such an impact, it is essential to minimize the damage to the rear of the vehicle, and thus to limit the extent to which the pole penetrates into the rear face of the vehicle during the impact, e.g. by putting into place a cross-member that is sufficiently strong to reduce the extent to which impacting objects penetrate in the event that an impact occurs.

In addition to the pole test, the Danner test requires motor vehicles to anticipate considerably the transfer of forces onto energy absorbers during an impact. In order to absorb such energy, it is possible to mount extensions between the side rails of the vehicle and the bumper beam.

Metal extensions or cross-members have long been used in bumpers because of their good rigidity. However, such parts suffer from the drawback of being relatively heavy. In addition, they are not easy to adapt to particular geometrical configurations that might be required by the vehicle, sometimes requiring additional parts that can be referred to as "absorbers".

That is why attempts have been made to replace the metal extensions or beams with parts that are made of plastics material and that satisfy better the two criteria of weight and of geometrical shape.

However, because of the low rigidity inherent to the materials used, such parts made of plastics material must have complex structures, in particular ribs, and the material used must be mixed with reinforcing fibers which increase its cost and make manufacturing the parts more complex, thereby tending to diminish the advantages procured by use of plastics material, without completely eliminating them.

OBJECTS AND SUMMARY OF THE INVENTION

An object of the invention is to propose a solution making it possible to take advantage of the capacity of beams made of plastics material to adapt easily to specific shapes, and of the rigidity procured by one or more metal strength members, without suffering from the drawbacks of such metal members.

To this end, the invention provides a motor vehicle beam shell designed to be placed behind a bumper skin, said shell being provided with a recess for receiving a strength member inside it, the strength member being, for example, a strength member made of metal, in particular of aluminum, or a strength member made of a composite material incorporating a metal, said shell being provided with shell cladding which interfits with the shell, thereby forming a hollow body defining the recess for receiving the strength member.

By means of the invention, the recess provided in the shell for receiving the metal strength member can make it unnecessary to fasten the strength member to the shell. It is thus possible to avoid weakening generated by fasteners between the strength member and the shell. Similarly, manipulations are avoided and, at the end of its life, the beam made up of shell and of the strength member is easier to recycle.

In addition, a hollow body is obtained that, of itself, constitutes a structure that stiffens the shell, in addition to the increase in rigidity resulting from the presence of the strength member in the shell.

In preferred manner, the recess is dimensioned to fit snugly around the outside shape of the strength member in certain regions, e.g. in the central portion of the shell or in the portion of the shell that is disposed in register with the side rails of the vehicle.

It is also possible to provide clearance around the strength member, in particular in the longitudinal direction (or travel direction) of the vehicle, so as to enable the shell to start deforming around the strength member in the event that an impact occurs, before the strength member becomes engaged.

Similarly, clearance in the longitudinal direction may enable the strength member to bend without stressing the shell, if the points at which pressure is applied to the beam during the impact are not in register with the points at which the beam is fastened to the structure of the vehicle.

A beam shell of the invention may further have one or more of the following characteristics:
  the recess is defined by a portion of the shell that has an open cross-section;
  the shell is dimensioned to fit snugly into the inside shape of the bumper skin behind which the beam is to be placed;
  the shell is provided with a plurality of recesses for receiving a plurality of strength members;
  the recess includes impact-absorbing means, e.g. local honeycombs;
  the shell is made of a thermoplastics material, in particular polypropylene;
  the shell cladding encloses the strength member; and
  the recess consists of a channel.

In a particular embodiment, the shell is provided with at least two fastening means for fastening to the structure of the vehicle, and, in the shell, the recess extends longitudinally from one fastening means to the other.

By means of such a shell, the strength member received in the recess is, for example, a metal cross-member, in the form of a tube of rectangular cross-section. The strength member then makes it possible to stiffen the beam considerably and to reduce the extent to which a pole penetrates into it when an impact occurs such as a pole test impact.

In another embodiment of the invention, the recess is provided in register with a motor vehicle side rail when the shell of the beam is mounted on the vehicle.

Such a shell can thus receive two strength members, one in register with each side rail, so that said strength members absorb energy from impacts such as Danner test impacts.

The invention also provides an assembly comprising a beam shell of the above-mentioned type and a strength member. Such an assembly may further have one or more of the following characteristics:
  the strength member is a tubular side rail extension having a generator line substantially parallel to the longitudinal direction of the vehicle, in particular an extension in the form of a beveled tube;

the strength member performs a function of vertically supporting the beam; and the extension received includes a support part, in particular a support for a stow/tow ring.

The shell made of a plastics material may be obtained by molding or by extrusion. It may also be overmolded onto the strength member(s) received in its recess.

The present invention also provides a motor vehicle beam designed to be placed behind a bumper skin, said beam including a strength member as described above. The beam may include a plurality of strength members.

BRIEF DESCRIPTION OF THE DRAWINGS

The invention will be better understood on reading the following description, given merely by way of non-limiting example, and given with reference to the accompanying drawings, in which:

FIG. 1 is an exploded perspective view of a first embodiment of a bumper beam of the invention;

FIG. 2 is a cross-section view on II—II of the beam of FIG. 1 in the assembled state;

MORE DETAILED DESCRIPTION

Figure 3:
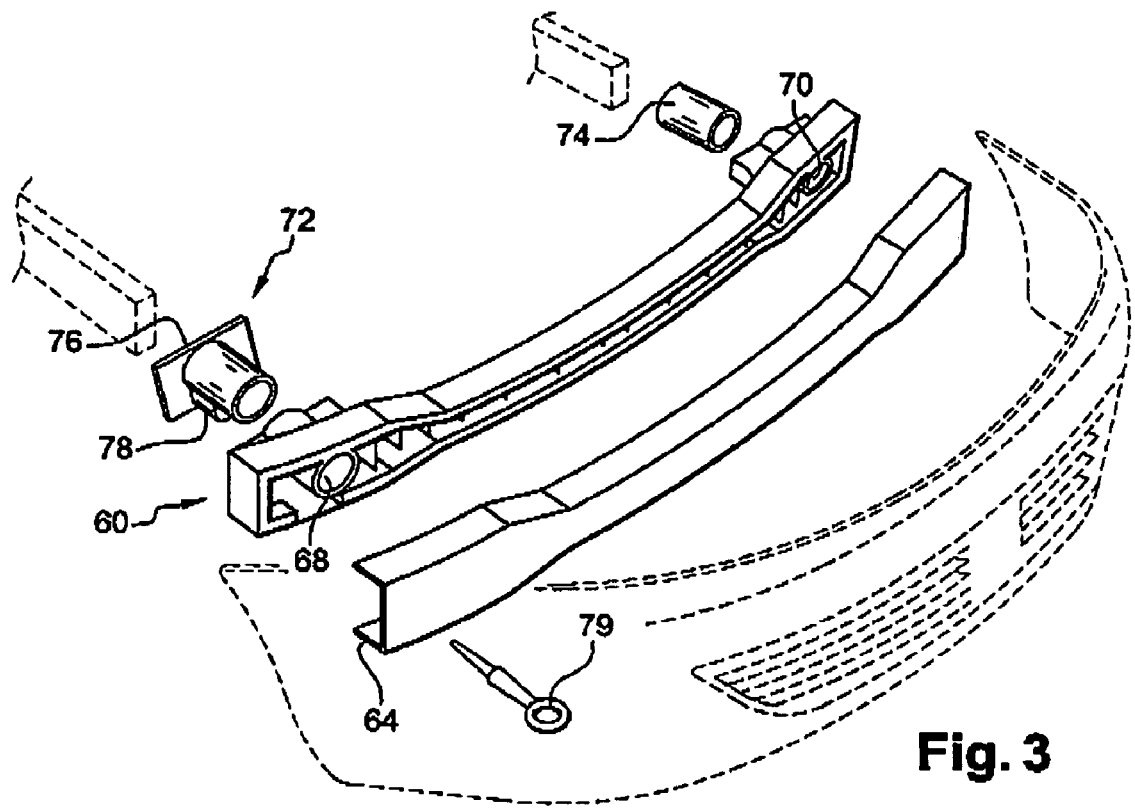
FIG. 3 is an exploded perspective view of a second embodiment of a bumper beam of the invention.

In the example described, the beam has a shell 1 of W-shaped cross section made of polypropylene filled with glass fibers that are long (longer than 1 mm). The shell is obtained by injection molding under usual conditions.

Because of its W-shaped cross-section, the shell has, going from its outside inwards, two mutually parallel outer longitudinal edges, namely a top outer edge 3 and a bottom outer edge 5, connected respectively to a top inner edge 7 and to a bottom inner edge 9, which inner edges are parallel to the outer edges, and are extended by respective ones of two converging walls 11 and 13 interconnected by an end wall 15.

The inner longitudinal edges 7 and 9, the converging walls 11 and 13, and the end wall 15 constitute an open U-shaped portion of the shell cross-section, and they define an elongate recess 17 for receiving a strength member in the form of a cross-member, constituted in this example by a metal tube 19 of rectangular cross-section.

As can be seen in the cross-section view of FIG. 2, the tube 19 comes into place inside the recess 17 by bearing against transverse webs 21 formed between the converging walls 11, 13 and the end-wall 15. The webs reinforce the shell and, in particular, prevent its cross-section from being opened out. In addition, they act as local absorbers, and, for this purpose, they can be distributed non-uniformly along the shell, e.g. by being more numerous in the vicinities of the two side rails (not shown) supporting the beam.

The shell 17 and the tube 19 form a compact assembly, as can be seen in FIG. 2, and said assembly is fitted into channel-section shell cladding 23.

Thus, the shell cladding closes the open cross-section of the recess and, with the shell, forms a hollow elongate body defining a recess enclosing the metal strength member.

In this way, the beam has rigidity coming firstly from the presence of the tube constituting a metal strength member, and secondly from the hollow body formed by the shell and by the shell cladding.

Added to these two factors are the shapes of the outer longitudinal edges 3, 5, and of the inner longitudinal edges 7, 9, as clad by the longitudinal edges 25, 27 of the shell cladding, which edges are secured to the shell by suitable means.

The fact that the metal tube and the above-mentioned longitudinal edges fit snugly together along the z-axis (i.e. vertically) also offers the additional advantage that the tube, in addition to performing its stiffening function for impacts, performs a function of supporting the beam, and thus the bumper, vertically (along the z-axis).

This function is particularly useful for rear bumpers which serve as loading sills, but it is also useful for front bumpers that might be stressed vertically by users.

In which case, it is useful for the shell and/or for the shell cladding to be dimensioned to fit snugly into the inside shape of the bumper skin.

Inside the shell cladding 23, transverse flanks 25 (only one of which is shown) ensure that the metal tube is longitudinally positioned properly.

Because it is fully held inside the shell merely by said shell fitting into the shell cladding, the metal tube 19 is not fastened at any point either to the shell or to the shell cladding.

The structural integrity of the shell is thus preserved and no zone of weakness is generated in it.

In addition, putting the tube in place inside the shell is a simple operation which is not followed by any specific fastening operation. Adding the strength member is thus a measure that is not costly in process terms.

Finally, it can be understood that the metal tube is very easy to separate from the shell and from the shell cladding when, at the end of the life of the beam, its component materials must be recycled.

It should also be noted that, although not shown in FIGS. 1 and 2, it can be advantageous to provide clearance between the metal tube and the shell in the longitudinal direction (along the x-axis) of the vehicle, so as to enable the tube to bend without deforming the shell to too large an extent in the event that impacts occur. The amount of this operating clearance needs to be assessed by the person skilled in the art, as a function of the materials used and of the dimensions and shapes of the various components of the beam.

Examples of usable materials are:

for the shell and for the shell cladding: polypropylene or polycarbonate-polybutyreneterephthalate, optionally mixed with glass fibers or with a reinforcing member constituted by an overmolded woven fabric such as Twintex sold by Vetrotex, whether they are made by injection molding, by compression, or by extrusion-pressing; and for the strength member: it is possible to use a metal structure, e.g. made of aluminum, or a composite structure.

In a variant (not shown), the metal strength member is limited to a portion only of the total length of the beam, at a location therealong that is particularly stressed in the event that it is subjected to an impact, e.g. its middle.

Another variant (not shown) that can be advantageous, in particular for limiting the weight of the beam, consists in providing a plurality of recesses in the shell for a plurality of strength members disposed in the beam. For example, a relatively short strength member can be placed in register with each side rail.

It should also be noted that, although the example shown corresponds to the shell 1 fitting into the shell cladding 23, it is also possible to make provision for the shell cladding 23 to fit into the shell 1.

In an embodiment that is not shown, the tube 19 is replaced with a corrugated sheet whose generator line is horizontal and parallel to the direction of travel of the vehicle.

In the embodiment shown in FIG. 3, the beam has a shell 60 of W-shaped cross-section of the same type as the shell shown in the embodiment of FIG. 1. The shell 60 fits into channel-section shell cladding 64.

Unlike the embodiment of FIG. 1, the shell 60 of FIG. 3 is provided with two orifices 68 and 70 serving to receive two extensions 72 and 74 that are tube-shaped.

The extensions 72, 74 can be mounted from the front or from the rear of the shell 60. They can be made of various strong materials, such as steel, aluminum, composite materials, or thermoplastics, etc.

A support for a stow/tow ring 79 is fastened to the extension 72. The ring 79 is fastened to the support 78 conventionally, e.g. by screw-fastening.

The extension 72 is also provided with a plate 76 serving to be sandwiched between the beam and the plate of the vehicle when the assembly is fastened to the vehicle. The plate 76 consolidates the fastening between the extension 72 and the shell 60, for the purpose of accommodating the greater stress that is exerted on the extension by the stow/tow ring 79.

In an embodiment that is not shown, both of the extensions received in the shell include respective plates such as the plate 76. Or indeed, neither of the extensions has such a plate.

In another embodiment that is not shown, the extensions 72 and 74 have beveled ends enabling them to adapt to the curvature of the bumper.

Figure 4:
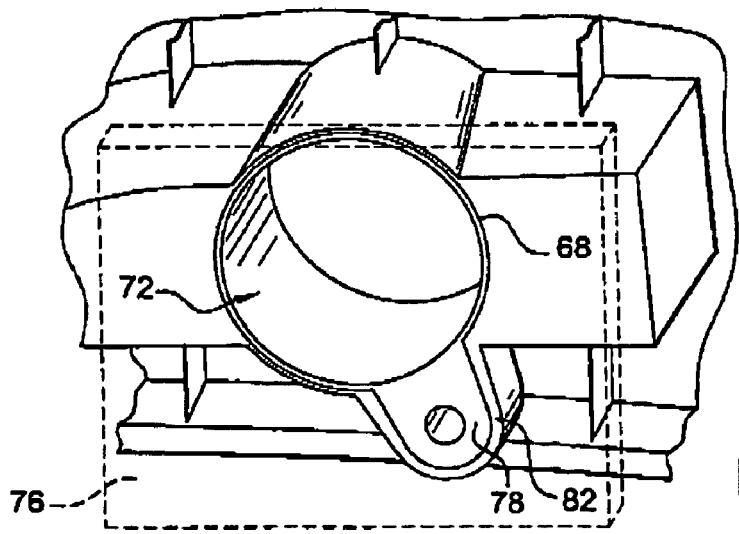
FIG. 4 is a rear view of a portion of the beam of FIG. 3.

It can be seen in FIG. 4 that, in addition to the orifice 68 serving to receive the extension 72, the shell 60 is provided with an orifice 82 serving to receive the support 78 of the stow/tow ring 79.

Among the advantages of the invention, it should be noted that, by means of the strength of the material of the extension 72, the support 78 for the stow/tow ring 79 is well anchored so that it is fastened to the beam sufficiently securely for it to perform its function.

It should also be noted that, once they are mounted on the shell 60 of the beam, the extensions 72 and 74 make it possible, by means of their rigid material, to strengthen the beam in order to satisfy the requirements of the specifications for the beam.

Furthermore, the strengthening procured by the extensions 72 and 74, in addition to the central strengthening procured by the tube 62, makes it possible to obtain a rigid plastics beam in which the fastening of the strength members 60, 72, 74 to the shell 60 does not weaken the beam as a whole.

In an embodiment that is not shown, in addition to the strength members 72 and 74, the shell 60 can include another strength member in the form of a cross-member, such as the tube 19 of FIG. 1.

Other variants can be deduced from the above-described examples, by making structure or function changes that lie within the ambit of the invention.

What is claimed is:

1. A motor vehicle beam shell designed to be placed behind a bumper skin, the shell having with a recess for receiving a strength member comprising metal, the shell consisting essentially of a thermoplastic material and including shell cladding which interfits with the shell, thereby forming a hollow body defining the recess for receiving the strength member.

2. The motor vehicle beam shell of claim 1, wherein the strength member comprises a composite material including the metal.

3. The motor vehicle beam shell of claim 2, wherein the metal comprises aluminum.

4. The motor vehicle beam shell of claim 1, wherein the strength member includes an outside shape and the recess is dimensioned to fit snugly around at least a region of the outside shape.

5. The motor vehicle beam shell of claim 4, wherein the region is selected from the group consisting of a central portion of the shell and a portion of the shell that is disposed in register with side rails of the vehicle.

6. The motor vehicle beam shell of claim 1, wherein the recess is defined by a portion of the shell that has an open cross-section.

7. The motor vehicle beam shell of claim 1, wherein the recess includes an impact-absorber.

8. The motor vehicle beam shell of claim 7, wherein the impact absorber includes honeycombs.

9. The motor vehicle beam shell of claim 1, wherein the thermoplastic material consists of polypropylene.

10. The motor vehicle beam shell of claim 1, wherein the shell cladding encloses the strength member.

11. The motor vehicle beam shell of claim 1, wherein the recess consists of a channel.

12. A motor vehicle beam designed to be placed behind a bumper skin, said beam including a strength member comprising metal and a shell having with a recess for receiving a strength member, the shell consisting essentially of thermoplastic material and including shell cladding which interfits with the shell, thereby forming a hollow body defining the recess for receiving the strength member.

* * * * *